(12) United States Patent
Wang

(10) Patent No.: US 10,948,300 B2
(45) Date of Patent: Mar. 16, 2021

(54) SYSTEMS AND METHODS FOR PATH DETERMINATION

(71) Applicant: BEIJING VOYAGER TECHNOLOGY CO., LTD., Beijing (CN)

(72) Inventor: Yanlong Wang, Beijing (CN)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 165 days.

(21) Appl. No.: 16/236,527

(22) Filed: Dec. 30, 2018

(65) Prior Publication Data
US 2020/0208983 A1 Jul. 2, 2020

Related U.S. Application Data

(63) Continuation of application No. PCT/CN2018/124540, filed on Dec. 28, 2018.

(30) Foreign Application Priority Data

Dec. 27, 2018 (CN) .......................... 201811615760.8

(51) Int. Cl.
*G01C 21/20* (2006.01)
*G01C 21/34* (2006.01)

(52) U.S. Cl.
CPC ......... *G01C 21/20* (2013.01); *G01C 21/3461* (2013.01); *G01C 21/203* (2013.01)

(58) Field of Classification Search
CPC ... G01C 21/20; G01C 21/203; G01C 21/3461
(Continued)

(56) References Cited

U.S. PATENT DOCUMENTS

| 6,308,177 B1 | 10/2001 | Israni et al. |
| 9,177,476 B2 * | 11/2015 | Breed ................. H04W 4/02 |

(Continued)

FOREIGN PATENT DOCUMENTS

| AU | 2011239328 B2 | 7/2014 |
| CN | 102722910 A | 10/2012 |

(Continued)

OTHER PUBLICATIONS

Baifan Chen et al., Real-time Detection of Dynamic Obstacle Using Laser Radar, 2008 The 9th International Conference for Young Computer Scientists, 1: 1728-1732, 2008.

(Continued)

*Primary Examiner* — Atul Trivedi
(74) *Attorney, Agent, or Firm* — Metis IP LLC

(57) ABSTRACT

The present disclosure is related to systems and methods for open-surface navigation for a vehicle based on a time-space map. The method includes determining a time-space map of a first area. The time-space map may include a plurality of time-space grids. Each time-space grid may include temporal information and geographic information corresponding to the time-space grid. The method also includes obtaining obstacle status of each of one or more obstacles corresponding to a first time period. The method also includes determining a plurality of navigable grids and a plurality of unnavigable grids among the plurality of time-space grids, based on the obstacle status. The method further includes determining a path for the vehicle based on the plurality of navigable grids.

20 Claims, 7 Drawing Sheets

100

(58) Field of Classification Search
USPC .......................................................... 701/423
See application file for complete search history.

(56) References Cited

U.S. PATENT DOCUMENTS

| | | | |
|---|---|---|---|
| 9,354,296 B2 | 5/2016 | Ubhi et al. | |
| 2010/0317420 A1* | 12/2010 | Hoffberg | G07F 17/323 |
| | | | 463/1 |
| 2012/0265380 A1 | 10/2012 | Kuwata et al. | |
| 2013/0339098 A1* | 12/2013 | Looman | G06Q 10/047 |
| | | | 705/7.36 |
| 2013/0339266 A1* | 12/2013 | Looman | G06Q 10/08 |
| | | | 705/338 |
| 2014/0067265 A1* | 3/2014 | Maston | G01C 21/3492 |
| | | | 701/533 |
| 2015/0194059 A1 | 7/2015 | Starr et al. | |
| 2017/0168488 A1* | 6/2017 | Wierzynski | G05D 1/0231 |
| 2017/0176191 A1* | 6/2017 | Li | G01S 19/01 |
| 2017/0219359 A1* | 8/2017 | Elhoushi | G01C 21/206 |
| 2017/0248963 A1* | 8/2017 | Levinson | B60W 30/09 |
| 2017/0363434 A1 | 12/2017 | Barth | |
| 2018/0204111 A1* | 7/2018 | Zadeh | G06K 9/3233 |
| 2018/0281680 A1* | 10/2018 | Gerardo Castro | B60R 1/00 |
| 2018/0308371 A1* | 10/2018 | Cao | B64C 39/024 |
| 2018/0309592 A1* | 10/2018 | Stolfus | G08G 1/202 |
| 2019/0279440 A1* | 9/2019 | Ricci | H04W 4/48 |
| 2020/0090426 A1* | 3/2020 | Barnes | G06N 5/025 |
| 2020/0184278 A1* | 6/2020 | Zadeh | G06F 16/953 |

FOREIGN PATENT DOCUMENTS

| | | |
|---|---|---|
| CN | 104002747 B | 8/2014 |
| CN | 106767860 A | 5/2017 |
| CN | 106931970 A | 7/2017 |
| CN | 108088455 A | 5/2018 |
| CN | 108444482 A | 8/2018 |
| KR | 101053922 B1 | 6/2011 |
| TW | 201202667 A | 1/2012 |

OTHER PUBLICATIONS

The Extended European Search Report in European Application No. 18826172.1 dated Mar. 5, 2020, 11 pages.

International Search Report in PCT/CN2018/124540 dated Sep. 27, 2019, 5 Pages.

Written Opinion in PCT/CN2018/124540 dated Sep. 27, 2019, 5 pages.

Bang Wang, A Study of Mobile Robot Motion Planning, Ph.D Thesis, Dublin City University, 1994.

Jacoby Larson et al., Autonomous Navigation and Obstacle Avoidance for Unmanned Surface Vehicles, SPIE Unmanned Systems Technology VIII, 2006.

Chelsea Sabo et al., Fuzzy Logic Unmanned Air Vehicle Motion Planning, Hindawi Publishing Corporation, 12: 1-14, 2012.

Ellips Masehian et al , Classic and Heuristic Approaches in Robot Motion Planning—A Chronological Review, World Academy of Science, Engineering and Technology, 1(5): 255-260, 2007.

First Office Action in Australian Application No. 2018286612 dated Nov. 15, 2019, 8 pages.

First Office Action in Canadian Application No. 3028703 dated Nov. 25, 2019, 5 pages.

Ciuseppe Casalino et al., A Three-Layered Architecture for Real Time Path Planning and Obstacle Avoidance for Surveillance USVs Operating in Harbour Fields, IEEE 2009, 2009, 8 Pages.

Maxim Likhachev et al., Anytime Dynamic A*: An Anytime, Replanning Algorithm, American Association for Artificial Intelligence(www.aaai.org), 2005, 10 Pages.

Jur Van Den Berg et al., Anytime Path Planning and Replanning in Dynamic Environments, Proceedings of the 2006 IEEE International Conference on Robotics and Automation Orlando, 2006, 6 Pages.

Jacobylarson et al., Autonomous Navigation and Obstacle Avoidance for Unmanned Surface Vehicles, Proceedings of SPIE—The International Society for Optical Engineering, 2006, 12 Pages.

Yogang Sinjay et al., Optimal path planning of unmanned surface vehicles, Indian Journal of Geo-Marine Sciences, 2018, 10 Pages.

Liang Yang et al., Survey of Robot 3D Path Planning Algorithms, Journal of Control Science and Engineering, 2016: 1-22, 2016.

The Office Action in Canadian Application No. 3028703 dated Aug. 14, 2020, 6 pages.

* cited by examiner

SYSTEMS AND METHODS FOR PATH DETERMINATION

CROSS-REFERENCE TO THE RELATED APPLICATIONS

This application is a Continuation of International Application No. PCT/CN2018/124540, filed on Dec. 28, 2018, which claims priority to Chinese Patent Application No. 201811615760.8, filed on Dec. 27, 2018. The entire contents of these applications are incorporated herein by reference.

TECHNICAL FIELD

This present disclosure generally relates to systems and methods for automatic navigation technology, and more particularly, to systems and methods for path determination in automatic navigation system.

BACKGROUND

The existing methods for local obstacle avoidance of unmanned vehicles are mainly focus on single obstacle, for example, velocity obstacles algorithm, artificial potential field algorithm. However, in a complex and irregular dynamic environments, the automatic navigation system of the unmanned vehicles may have difficulty to plan a path in real time by using these methods, due to a lack of consideration of states of multiple obstacles and multiple constraints, such as International Regulations for the Prevention of Collisions at Sea (COLREGs) and the manipulation performance of the unmanned vehicles. Therefore, it is desirable to provide methods and systems for determining an optimal path for an unmanned vehicles in the automatic navigation system.

SUMMARY

According to an aspect of the present disclosure, a method implemented on a computing device for open-surface navigation for a vehicle based on a time-space map is provided. The computing device may include a memory and plurality of processors. The method may include determining a time-space map of a first area. The time-space map may include a plurality of time-space grids. Each time-space grid may include temporal information and geographic information corresponding to the time-space grid. The method may also include obtaining obstacle status of each of one or more obstacles corresponding to a first time period. The method may further include determining a plurality of navigable grids and a plurality of unnavigable grids among the plurality of time-space grids, based on the obstacle status. The method may still further include determining a path for the vehicle based on the plurality of navigable grids.

In some embodiments, the method may also include determining an obstacle volume for each of the one or more obstacles based on the obstacle status. The method may further include determining the plurality of navigable grids and the plurality of unnavigable grids based on the obstacle volumes of the one or more obstacles.

In some embodiments, the method may also include determining an obstacle trajectory projection of each of the one or more obstacles based on the obstacle volume corresponding to the time period. The method may further include determining the plurality of navigable grids and plurality of unnavigable grids based on the obstacle trajectory projections of the one or more obstacles.

In some embodiments, the obstacle volume may be determined based on a profile of the obstacle.

In some embodiments, the method may also include determining a fuzzy set related to each of the one or more obstacles based on the obstacle status. The method may further include determining the plurality of navigable grids and plurality of unnavigable grids based on the fuzzy sets.

In some embodiments, the method may also include determining an unnavigable area related to the obstacle based on a first criteria. The method may further include determining the fuzzy set based on the unnavigable area.

In some embodiments, the method may also include determining a destination of the vehicle. For at least a portion of the plurality of navigable grids, the method may further include determining a cost function between two adjacent navigable grids. The method may further include determining a heuristic function between a current grid of the vehicle and the destination of the vehicle. The method may further include determining the path for the vehicle based on the destination of the vehicle, a plurality of cost functions and the heuristic function.

In some embodiments, the cost function may be determined based on temporal information and geographic information of the two adjacent navigable grids.

In some embodiments, the heuristic function may be determined based on temporal information and geographic information of the current grid of the vehicle and the destination of the vehicle.

According to another aspect of the present disclosure, a system for open-surface navigation for a vehicle based on a time-space map may include at least one non-transitory storage medium including a set of instructions; and at least one processor in communication with the at least one non-transitory storage medium. When executing the set of instructions, the at least one processor may be directed to determine a time-space map of a first area, the time-space map including a plurality of time-space grids, wherein each time-space grid includes temporal information and geographic information corresponding to the time-space grid. The at least one processor may also be directed to obtain obstacle status of each of one or more obstacles corresponding to a first time period. The at least one processor may also be directed to determine a plurality of navigable grids and a plurality of unnavigable grids among the plurality of time-space grids, based on the obstacle status. The at least one processor may further be directed to determine a path for the vehicle based on the plurality of navigable grids.

According to still another aspect of the present disclosure, a non-transitory computer readable medium may include executable instructions that, wherein when executed by at least one processor, the executable instructions cause the at least one processor to effectuate a method. The method may include determining a time-space map of a first area. The time-space map may include a plurality of time-space grids. Each time-space grid may include temporal information and geographic information corresponding to the time-space grid. The method may also include obtaining obstacle status of each of one or more obstacles corresponding to a first time period. The method may also include determining a plurality of navigable grids and a plurality of unnavigable grids among the plurality of time-space grids, based on the obstacle status. The method may also include determining a path for the vehicle based on the plurality of navigable grids.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
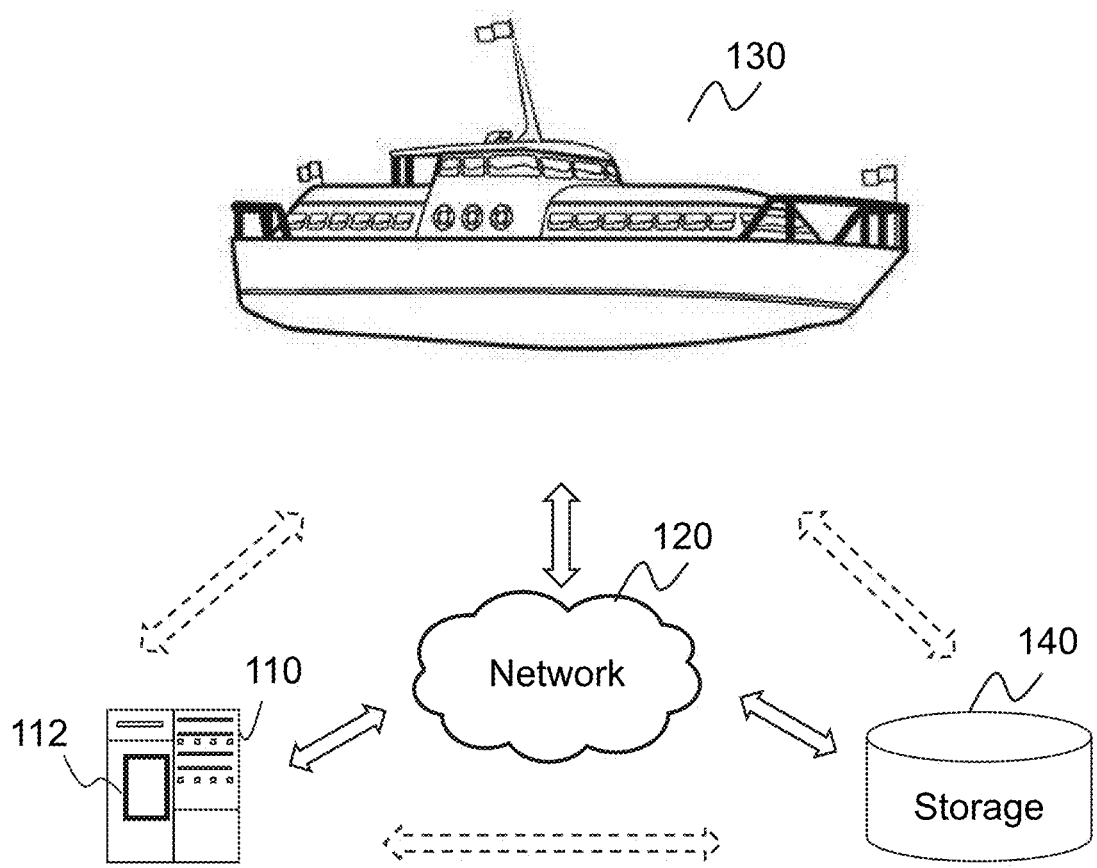
FIG. 1 is a schematic diagram illustrating an exemplary automatic navigation system associated with a vehicle according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

Moreover, while the systems and methods disclosed in the present disclosure are described primarily regarding determining a path of a vehicle), it should be understood that this is only one exemplary embodiment. The system or method of the present disclosure may be applied to any other kind of navigation system. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

FIG. 1 is a schematic diagram illustrating an exemplary automatic navigation system 100 associated with a vehicle according to some embodiments of the present disclosure. In some embodiments, the automatic navigation system 100 may include a server 110, a network 120, a vehicle 130, and a storage 140.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the vehicle 130 and/or the storage 140 via the network 120. As another example, the server 110 may be directly connected to the vehicle 130 and/or the storage 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data associated with driving information and/or a state of the vehicle 130 to perform one or more functions described in the present disclosure. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 120 to communicate with one or more components of the automatic navigation system 100 (e.g., the vehicle 130, the storage 140). In some embodiments, the server 110 may be directly connected to or communicate with one or more components in the automatic navigation system 100 (e.g., the vehicle 130, the storage 140). In some embodiments, the server 110 may be integrated in the vehicle 130.

The network 120 may facilitate exchange of information and/or data. In some embodiments, one or more components in the automatic navigation system 100 (e.g., the server 110, the vehicle 130, or the storage 140) may send information and/or data to other component(s) in the automatic navigation system 100 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points, through which one or more components of the automatic navigation system 100 may be connected to the network 120 to exchange data and/or information.

The vehicle 130 may be any type of autonomous vehicle. The autonomous vehicle may be capable of sensing its environment and navigating without human maneuvering. In some embodiment, the vehicle 130 may be an unmanned surface vehicle (USV). The vehicle 130 may include structures of a conventional ship, for example, a hull (e.g., a bow, a keel, a stern), a propulsion system (e.g., a motor or engine turning propeller, an impeller or wave propulsion fins), a steering system (e.g., a rudder), or the like. The propulsion systems may be configured to control the moving speed of the vehicle 130. The steering system may be configured to adjust the heading and/or direction of the vehicle 130. The propulsion system and/or the steering system may include any combination of mechanisms to implement the functions thereof.

The vehicle 130 may also include a plurality of detection units configured to detect sailing information associated with the vehicle 130. The plurality of detection units may include a camera, a global position system (GPS) module, an acceleration sensor (e.g., a piezoelectric sensor), a velocity sensor (e.g., a Hall sensor), a distance sensor (e.g., a radar, a LIDAR, an infrared sensor), or the like.

For example, the distance sensor (e.g., a radar, a LiDAR, an infrared sensor) may determine a distance between the vehicle 130 and other object (e.g., a static obstacle, a motional obstacle, another vehicle). The velocity sensor (e.g., a Hall Effect sensor) may determine a velocity (e.g., an instantaneous velocity, an average velocity) of the vehicle 130. The acceleration sensor (e.g., an accelerometer) may determine an acceleration (e.g., an instantaneous acceleration, an average acceleration) of the vehicle 130.

In some embodiments, the plurality of detection units may sense environment around the vehicle 130. For example, one or more detection units may detect an obstacle (e.g., a static obstacle, a motional obstacle) around the vehicle 130. The static obstacles may include an island, a reef, or the like, or any combination thereof. The motional obstacles may include a moving ship, an animal, or the like, or any combination thereof.

The storage 140 may store data and/or instructions. In some embodiments, the storage 140 may store data obtained from the vehicle 130, such as driving information and a state of the vehicle 130 acquired by the plurality of sensors. In some embodiments, the storage 140 may store data and/or instructions that the server 110 may execute or use to perform exemplary methods described in the present disclosure. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may be connected to the network 120 to communicate with one or more components of the automatic navigation system 100 (e.g., the server 110, the vehicle 130). One or more components in the automatic navigation system 100 may access the data or instructions stored in the storage 140 via the network 120. In some embodiments, the storage 140 may be directly connected to or communicate with one or more components in the automatic navigation system 100 (e.g., the server 110 and the vehicle 130). In some embodiments, the storage 140 may be part of the server 110.

It should be noted that the automatic navigation system 100 is merely provided for the purposes of illustration, and is not intended to limit the scope of the present disclosure. For persons having ordinary skills in the art, multiple variations or modifications may be made under the teachings of the present disclosure. For example, the automatic navigation system 100 may further include a database, an information source, or the like. As another example, the automatic navigation system 100 may be implemented on other devices to realize similar or different functions. However, those variations and modifications do not depart from the scope of the present disclosure.

Figure 2:
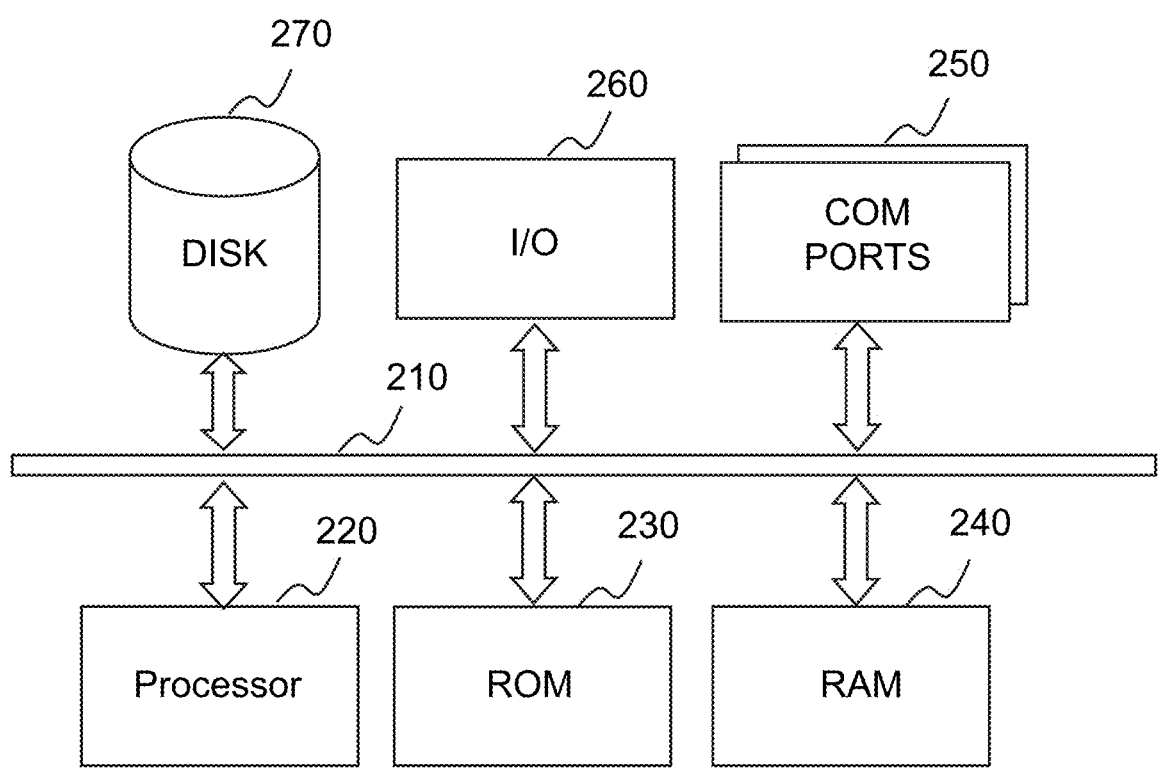
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing engine 112 may be implemented on the computing device 200 and configured to perform functions of the processing engine 112 disclosed in this disclosure.

The computing device 200 may be used to implement any component of the automatic navigation system 100 of the present disclosure. For example, the processing engine 112 of the automatic navigation system 100 may be implemented on the computing device 200, via its hardware, software program, firmware, or a combination thereof. Although only one such computer is shown for convenience, the computer functions related to the automatic navigation system 100 as described herein may be implemented in a distributed manner on a number of similar platforms to distribute the processing load.

The computing device 200, for example, may include communication (COMM) ports 250 connected to and from a network (e.g., the network 120) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device 200 may further include program storage and data storage of different forms, for example, a disk 270, and a read only memory (ROM) 230, or a random access memory (RAM) 240, for various data files to be processed and/or transmitted by the computing device 200. The exemplary computing device 200 may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As in another example, operation A and operation B may also be performed by two different processors jointly or separately in the computing device 200 (e.g., the first processor executes operation A and the second processor executes operation B, or the first and second processors jointly execute operations A and B).

Figure 3:
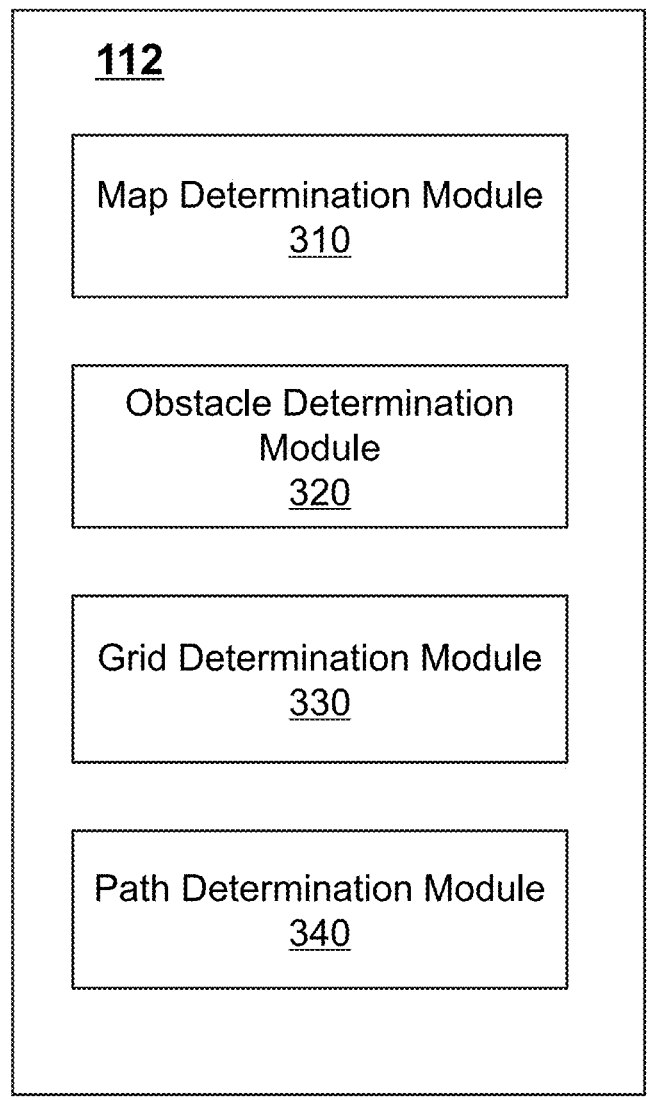
FIG. 3 is a block diagram illustrating an exemplary processing engine according to some embodiments of the present disclosure.

FIG. 3 is a block diagram illustrating an exemplary processing engine according to some embodiments of the present disclosure. The processing engine 112 may include a map determination module 310, an obstacle determination module 320, a grid determination module 330 and a path determination module 340.

The map determination module 310 may determine a search area on a map. In some embodiments, the map determination module 310 may obtain the map from a storage device (e.g., the storage 140), such as the ones disclosed elsewhere in the present disclosure. The search area may include a starting point and a destination of the vehicle. The map determination module 310 may be configured to search an optimal path for the vehicle to get from the starting point to the destination point in the search area. The search area may be a dynamic search area or a static search area. If obstacles in the search area are unknown or are in motion, the search area may be a dynamic search area. If obstacles in the search area are known or are motionless, the search area may be a static search. In some embodiments, the search area may be a two-dimensional plane or a three-dimensional space. For example, if the vehicle is a car or a ship, the search area may be a two-dimensional area. If the vehicle is an aircraft or a submarine vehicle, the search area may be a three-dimensional space.

To simplify the pathfinding task, the map determination module 310 may divide the search area into a plurality of space grids. The optimal path may be determine based on the plurality of grids. In some embodiments, a shape of a space grid may include but not limited to a square, a rectangle, a hexagon, a triangle, or the like, or any combination thereof. The space grid may include a node. In some embodiments, the node may be a center of the space grid. The space grid may include geographic information corresponding to the grid. In some embodiments, the geographic information may be a coordinate of the center in the search area. The pathfinding task may be considered as moving the vehicle crossing centers of space grids.

The space grid may include a navigable status or an unnavigable status. The navigable status may represent that the vehicle can move into the space grid. The unnavigable status may represent that the vehicle cannot move into the space grid. For example, if a space grid A is occupied by an obstacle, the vehicle cannot move into the space grid A, thus the space grid A is in the unnavigable status.

Figure 4:
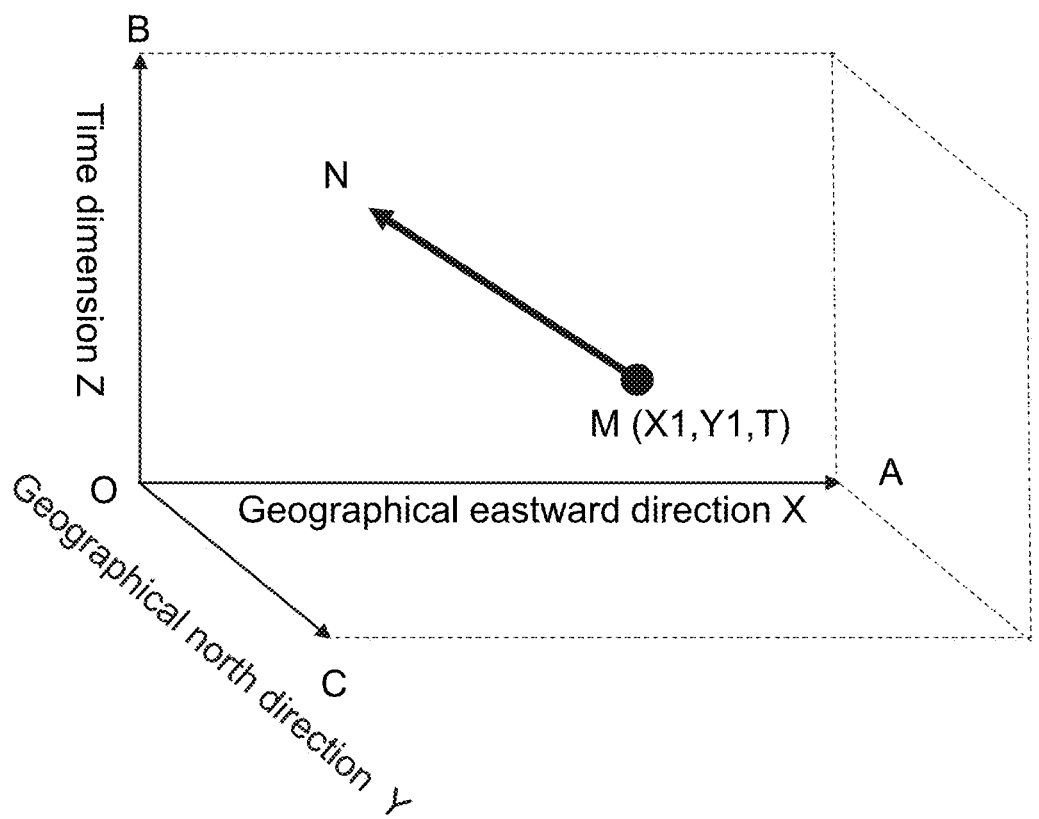
FIG. 4 is a schematic diagram illustrating an exemplary time-space map according to some embodiments of the present disclosure.
Figure 5A:
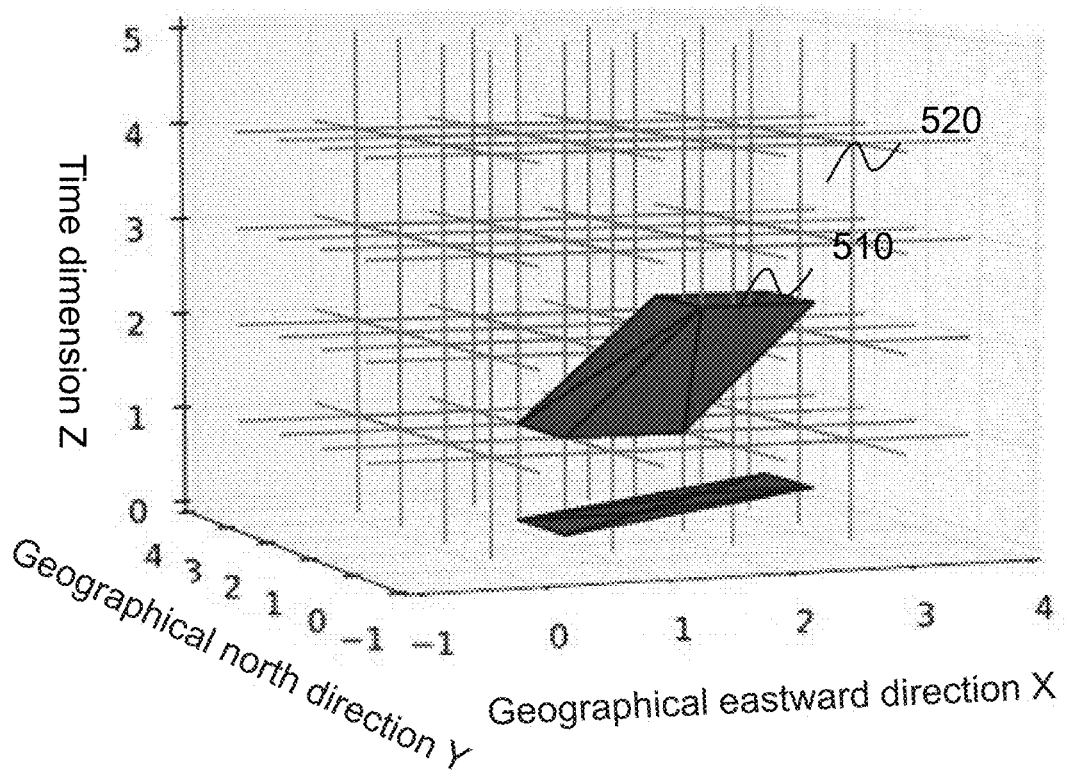
FIG. 5A is a schematic diagram illustrating an exemplary process for gridding a three-dimensional space according to some embodiments of the present disclosure.

The map determination module 310 may further determine a time-space map including a plurality of time-space grids corresponding to the search area. In some embodiments, the map determination module 310 may determine the time-space map as shown in FIG. 4 or FIG. 5A. Detailed description related to the time-space map and time-space grid may be found elsewhere of the present disclosure, e.g., FIG. 4, FIG. 5A, FIG. 5B and the description thereof.

The map determination module 310 may add temporal information of the space-grid to generate a plurality of time-space grid. As shown in FIG. 5A, the x-y plane may represent the search area, and the z axis may represent to time dimension. The time-space grid may represent status change of the space grid over a period of time. For example, the processing engine 112 may add temporal information T into the space grid A (A1, A2) and determine a time-space grid (A1, A2, T). The time-space grid (A1, A2, T) may be configured to represent the status (the navigable status or the unnavigable status) of the space grid A (A1, A2). For example, the time-space grid (A1, A2, T1) may be configured to represent whether the grid A (A1, A2) is navigable at time point T1.

In some embodiments, the map determination module 310 may add temporal information of the space-grid to generate a plurality of time-space grid when the search area is a three-dimensional space. If the search area is a three-dimensional space, the time-space map and the time-space grid may be four-dimensional (not shown in the figure.) For example, the processing engine 112 may add temporal information T into a three-dimensional space grid A (A1, A2, A3) and determine a time-space grid (A1, A2, A3, T). The time-space grid (A1, A2, A3, T) may be configured to represent the status (the navigable status or the unnavigable status) of the space grid A (A1, A2, A3). For example, the time-space grid (A1, A2, A3, T1) may be configured to represent whether the grid A (A1, A2, A3, T1) is navigable at time point T1.

The obstacle determination module 320 may determine obstacle information of an obstacle. The obstacle information may include a type of an obstacle (e.g., a vehicle, a pedestrian, an animal, a building, a tree, a roadblock), a location of the obstacle, a size of the obstacle, a velocity of the obstacle, a distance between the current location of the vehicle and the location of the obstacle, or the like, or any combination thereof.

In some embodiments, the obstacle may be a static obstacle. For example, the obstacle may be a building, a tree, a roadblock, a rock on the sea, an island, or the like or any combination. If the static obstacle is known, the processing engine 112 may obtain the static obstacle information from a storage device (e.g., the storage 140), such as the ones disclosed elsewhere in the present disclosure.

In some embodiments, the obstacle may be an obstacle in motion or an unknown obstacle. For example, the obstacle may be a moving vehicle, a pedestrian, an animal, an unknown rock, an unknown island. The processing engine 112 may obtain the obstacle information of the obstacle in motion or the unknown obstacle from the detection units (e.g., a camera, a radar) of the vehicle.

The grid determination module 330 may determine plurality of navigable grids and plurality of unnavigable grids based the obstacle information among the plurality of time-space grids. The processing engine 112 may determine whether a time-space grid is occupied by the obstacle at a time point based on the obstacle information.

For example, if the obstacle is a static obstacle located in (A1, A2), the processing engine 112 may determine the status of a plurality of time-space grids corresponding to the location (A1, A2) (e.g., (A1, A2, T1), (A1, A2, T2), (A1, A2, T3), wherein T1, T2 and T3 represent different time points) as unnavigable.

If the obstacle is in motion, the grid determination module 330 may determine a moving trajectory of the obstacle in the time-space map based on the obstacle information. Then the grid determination module 330 may determine plurality of navigable grids and plurality of unnavigable grids based on the moving trajectory of the obstacle in the time-space map.

The path determination module 340 may determine a path for the vehicle based on the plurality of navigable grids. After determining the navigable grids, the path determination module 340 may search the navigable grids and find an optimal path for the vehicle to get from the starting point to the destination point in the search area.

The path determination module 340 may determine the optimal path for the vehicle to get from the starting point to the destination point in the search area. For a pathfinding task, a time-space grids may include a total cost value and a heuristic value. The total cost value of a time-space grid A may be related to a movement cost to move from the starting grid to the time-space grid A, following the path generated to get time-space grid A. The heuristic value of the time-space grid A may be related to an estimated movement cost to move from the time-space grid A to the destination grid. The path determination module 340 may search a plurality of adjacent grids of the starting grid and determine the grid with minimum sum of the cost value and the heuristic value as a parent grid. Then the path determination module 340 may search a plurality of adjacent grids of the parent grid and determine the grid with minimum sum of the cost value and the heuristic value as a new parent grid. The path determination module 340 may iteratively search the new parent grid until the path reaches to the destination grid.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

FIG. 4 is a schematic diagram illustrating an exemplary time-space map according to some embodiments of the present disclosure. As shown in FIG. 4, OA, OB, and OC may correspond to a first geographical direction (e.g., a geographical eastward direction, expressed as X-axis), a second geographical direction (e.g., a geographical north direction, expressed as Y-axis), and a time dimension (expressed as Z-axis), respectively. It is assumed that at a time point T, an obstacle moves from a point M $(x_1, y_1)$ with a moving speed of v(t), and a moving direction of h(t). After a time period $\Delta t$, the obstacle may arrive at a point N, the coordinates of the point N in the X-Y-Z coordinate system may be expressed as $(x(T+\Delta t), y(T+\Delta t), T+\Delta t)$ according to Equation (1):

$$\begin{cases} x(T+\Delta t) = x_1 + \int_T^{T+\Delta t} v(t) \times \sin(h(t))dt \\ y(T+\Delta t) = y_1 + \int_T^{T+\Delta t} v(t) \times \cos(h(t))d \end{cases} \quad (1)$$

where $x_1$ may refer to the position of the perpendicular projection of the point M onto the X-axis; $y_1$ may refer to the position of the perpendicular projection of the point M onto the Y-axis; T may refer to the time point at which the obstacle is located at the point M; $\Delta t$ may refer to the time period of the obstacle moves from the point M to the point N; $x(T+\Delta t)$ may refer to the position of the perpendicular projection of the point N onto the X-axis; $y(T+\Delta t)$ may refer to the position of the perpendicular projection of the point N onto the Y-axis; v(t) may refer to the moving speed of the obstacle; h(t) may refer to the moving direction of the obstacle.

In FIG. 4, the obstacle is considered as a mass point. Thus, the trajectory shown in FIG. 4 is a line and represents a movement trajectory of the mass center or the geometric center of the obstacle with respect to time. In some embodiments, the obstacle may have a profile. Accordingly, the movement trajectory of the obstacle in a specific time period may be represented as a 3D shape in the X-Y-Z space, as shown in FIG. 5A.

FIG. 5A is a schematic diagram illustrating an exemplary process for gridding a three-dimensional space according to some embodiments of the present disclosure. As shown in FIG. 5A, the X-Y-Z space (e.g., the time-space map) shown in FIG. 4 may be divided into a plurality of time-space grids. A time-space grid may be represented by coordinates of a center point of the time-space grid. A length $\Delta L$ and a width $\Delta W$ of the time-space grid may correspond to a certain area of the X-Y plane. The height $\Delta T$ of the time-space grid may correspond to a certain time period. The time-space grid may be used as a basic unit for a path-finding task of the vehicle. In some embodiments, the size of the time-space grid may be determined based on one or more features of a vehicle. The one or more features of the vehicle may include vehicle type, vehicle weight, vehicle model, engine power, brake efficiency, or the like, or any combination thereof.

Each of the time-space grids may correspond to a navigability of a geographical area at a time point. As used herein, the navigability of a specific geographical area may indicate that a vehicle may travel in the specific geographical area without colliding an obstacle. For example, a time-space grid (x, y, T) may correspond to the navigability of a geographical area (x, y) in a time period T. If a time-space grid (x, y, T) is occupied by the movement trajectory of the obstacle, for example, a grid 410 shown in FIG. 5A, that represents the position (x, y) is not navigable for the vehicle at time T. If the time-space grid (x, y, T) is not occupied by the movement trajectory of the obstacle, for example, a grid 420 shown in FIG. 5A, that represents the position (x, y) is navigable for the vehicle at time T.

In some embodiments, the navigability of the geographical area may be determined based on the spatial relationship between a time-space grid corresponding to the geographical area and a movement trajectory corresponding to an obstacle. For example, the processing engine 112 may determine whether the time-space grid corresponding to the geographical area overlaps with the movement trajectory corresponding to the obstacle. In response to a determination that the time-space grid corresponding to the geographical area in the time period overlaps with the movement trajectory corresponding to the obstacle, the processing engine 112 may determine that the geographical area represented by the time-space grid is not navigability in the time period. In response to a determination that the time-space grid corresponding to the geographical area in the time period does not overlaps with the cubic movement trajectory corresponding to the obstacle, the processing engine 112 may determine that the geographical area represented by the time-space grid is navigability in the time period.

In some embodiments, the processing engine 112 may determine whether the time-space grid corresponding to the geographical area overlaps with the movement trajectory corresponding to an obstacle by performing a collision detection. In some embodiments, the processing engine 112 may perform the collision detection between the time-space grid corresponding to the geographical area and the movement trajectory corresponding to an obstacle based on one or more collision detection algorithm. The collision detection algorithm may include an axially aligned bounding box (AABB) algorithm, an oriented bounding box (OBB) algorithm, or the like. For example, the processing engine 112 may completely wrap an object (e.g., an obstacle) with a bounding volume. The bounding volume may be a bounding box (e.g., a cuboid, a cube), a bounding capsule, a bounding cylinder, a bounding sphere, or the like. In the AABB algorithm, the bounding box may be aligned with axes of the coordinate system. The processing engine 112 may further determine whether a collision occurs between the bounding volume including the object and each of the plurality of time-space grids in the X-Y-Z space based on a size and a position of the bounding volume including the object. For example, the processing engine 112 may determine whether a collision occurs between the bounding volume including the object and each of the plurality of time-space grids in the X-Y-Z space by comparing the bounding volume including the obstacle with the each of the plurality of time-space grids. In response to a determination that there is a collision occurs between the bounding volume including the object and one of the plurality of time-space grids in the X-Y-Z space, the processing engine 112 may determine that the bounding volume including the object overlaps with the time-space grid. Accordingly, the processing engine 112 may determine that the time-space grid is not navigability in the time period.

Figure 5B:
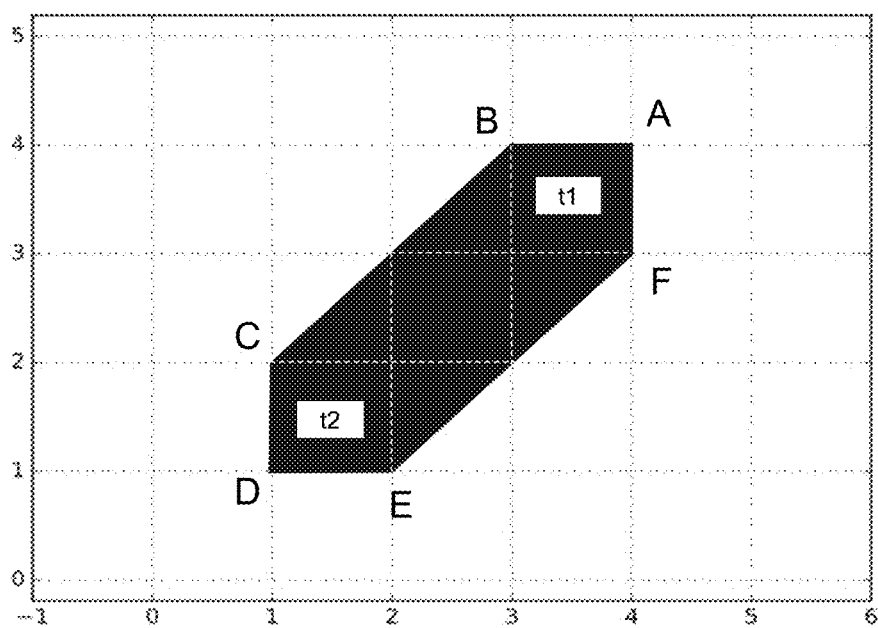
FIG. 5B is a schematic diagram illustrating an exemplary bounding box of an obstacle on an X-Y plane according to some embodiments of the present disclosure.

In some embodiments, the processing engine 112 may perform a collision detection between each of the plurality of time-space grids and an obstacle based on a projection of the obstacle on the X-Y plane. As illustrated in FIG. 5B, it is assumed that the obstacle is a cube, and the start time point and the end time point of the moving of the obstacle are $t_1$ and $t_2$, respectively, the processing engine 112 may determine that coordinates of the center point of the obstacle at the time point $t_1$ and the time point $t_2$ are $(x_{t1}, y_{t1})$ and $(x_{t2}, y_{t2})$, respectively, according to Equation (1). The processing engine 112 may project the positions of the obstacle at time point t1 and time point $t_2$ on the X-Y plane, as illustrated in FIG. 5A. The processing engine 112 may generate a 2D bounding box (e.g., bounding box ABCDE) on the X-Y plane by connecting the vertexes of the obstacle according to the moving direction of the obstacle, which indicates an area through which the obstacle moves from time point t1 to the time point $t_2$, as illustrate in FIG. 5B. FIG. 5B is a schematic diagram illustrating an exemplary bounding box of an obstacle on an X-Y plane according to some embodiments of the present disclosure.

In some embodiments, the processing engine 112 may divide the X-Y plane by a plurality of 2D grids with a length of $\Delta L$ and a width of $\Delta W$, which are the same as the projection of the plurality of time-space grids in the X-Y-Z space on the plane X-Y. Accordingly, the processing engine 112 may determine whether a time-space grid corresponding to a geographical area in a time period is navigability by comparing the 2D bounding box of the moving obstacle in the time period and each of the 2D grids in the X-Y plane. For example, the processing engine 112 may determine whether the 2D bounding box of the moving obstacle in the time period overlaps with each of the plurality of 2D grids in the X-Y plane. In response to a determination that the 2D bounding box of the moving obstacle in the time period overlaps with a 2D grid in the X-Y plane, the processing engine 112 may determine that corresponding time-space grids in the X-Y-Z space is not navigable in the time period. In response to a determination that the 2D bounding box of the moving obstacle in the time period does not overlap with a 2D grid in the X-Y plane, the processing engine 112 may determine that corresponding time-space grids in the X-Y-Z space is navigability in the time period.

As described above, the processing engine 112 may need to compare the bounding box including the obstacle with all of the time-space grids in the X-Y-Z space to determine whether the bounding box overlaps with each of the time-space grids, which may lead to a low computational efficiency. In addition, the bounding box including the obstacle in the AABB algorithm may need to be aligned with the axis and it is sensitive to the direction of the obstacle. In some scenarios, the bounding box including the obstacle may include one or more time-space grids that do not overlap with the obstacle, which may lead to a low accuracy in the collision detection. The method disclosed in the present disclosure covert the 3D structure collision problem into a 2D plane overlapping problem, which may greatly improve the computational efficiency and the accuracy of the collision detection.

Figure 6A:
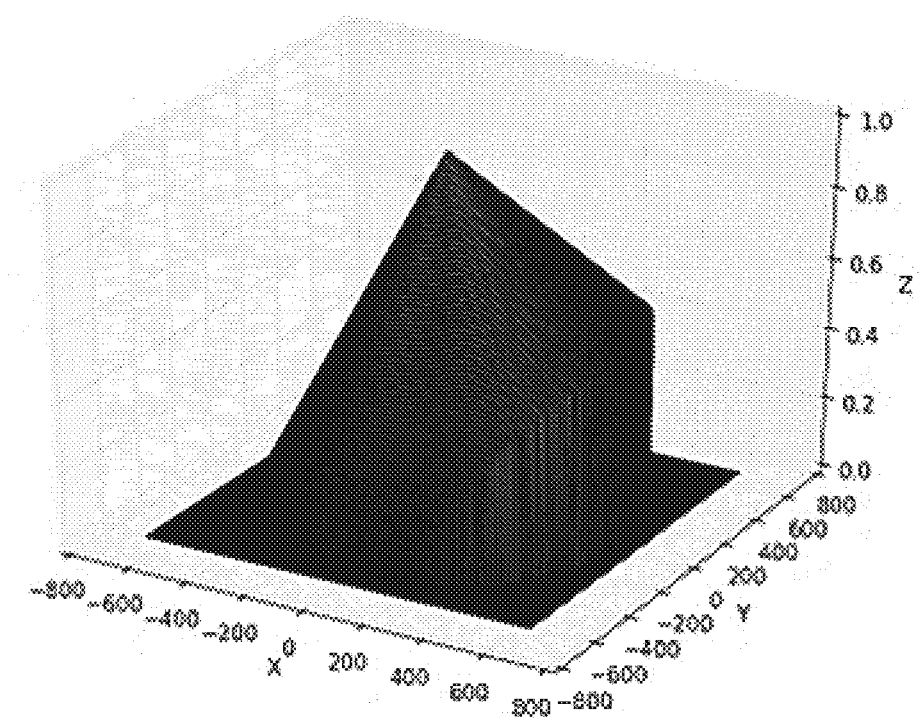
FIG. 6A is a schematic diagram illustrating an exemplary membership function associated with a motion area of an obstacle according to some embodiments of the present disclosure.
Figure 6B:
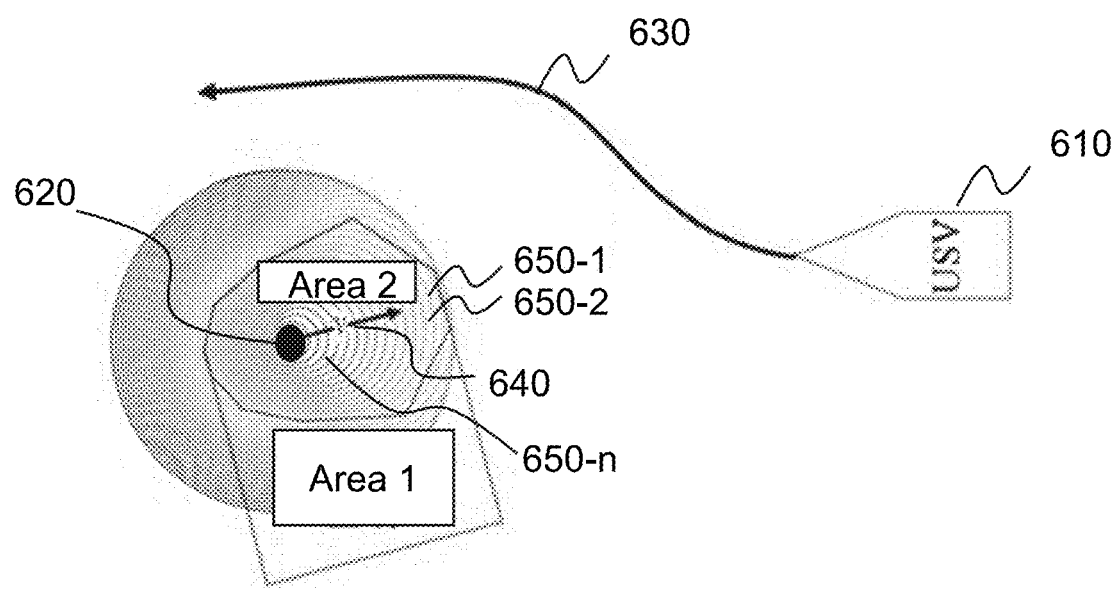
FIG. 6B is a schematic diagram illustrating exemplary contour lines of a membership function associated with a motion area of an obstacle according to some embodiments of the present disclosure.

FIG. 6A is a schematic diagram illustrating an exemplary membership function associated with a motion area of an obstacle according to some embodiments of the present disclosure. FIG. 6B is a schematic diagram illustrating exemplary contour lines of a membership function associated with a motion area of an obstacle according to some embodiments of the present disclosure.

In some embodiments, a vehicle may be considered as a point, and the size of an obstacle may be determined based on a size of the vehicle, a safe navigation distance of the vehicle, and one or more rules (e.g., International Regulations for the Prevention of Collisions at Sea (COLREGs)). As used herein, the safe navigation distance of the vehicle may refer to the minimum distance between the vehicle and an obstacle to avoid a collision between the vehicle and the obstacle.

In some embodiments, the processing engine 112 may determine a non-navigable area around the obstacle according to the COLREGs. As used herein, the non-navigable area may refer to an area that the vehicle cannot enter when performing a path planning. For example, according to Rule 14a of COLREGs, "when two power-driven vessels are meeting on reciprocal or nearly reciprocal courses so as to involve risk of collision each shall alter her course to starboard so that each shall pass on the port side of the other". Accordingly, the processing engine 112 may determine a non-navigable area on the right side of an obstacle vessel, such as the SUV may be turned to right to avoid the obstacle vessel. As another example, according to Rule 15 of COLREGs, "when two power-driven vessels are crossing so as to involve risk of collision, the vessel which has the other on her own starboard side shall keep out of the way and shall, if the circumstances of the case admit, avoid crossing ahead of the other vessel". Accordingly, the processing engine 112 may determine a non-navigable area in front of the obstacle vessel, such as the vehicle may travel behind the stern of the obstacle vessel to avoid the obstacle vessel.

In some embodiments, an obstacle may move on the water according to their own movement's law, and the movement state of the obstacle may be changed due to movements of other obstacles. Accordingly, the position and the movement state of the obstacle may change with time. Generally, the more comprehensive the motion information associated with the obstacle, the more favorable it is to accurately predict the motion state of the obstacle, which may reduce invalid operations, and improve the efficiency of path planning. In some embodiments, the processing engine 112 may determine the motion area model of the obstacle based on the motion information (e.g., a position of the obstacle, a moving speed of the obstacle, a moving direction of the obstacle) associated with the obstacle, a size of the vehicle, a safe navigation distance of the vehicle, and one or more rules (e.g., International Regulations for the Prevention of Collisions at Sea (COLREGs)), according to a fuzzy sets theory. As used herein, the fuzzy sets may refer to sets whose elements have degrees of membership. The processing engine 112 may determine the motion area of the obstacle based on the motion area model of the obstacle. In the path planning of the vehicle, the vehicle may not be allowed to enter the motion area of the obstacle.

In some embodiments, the processing engine 112 may determine a membership function associated with the motion area of the obstacle based on the fuzzy set theory according to Equation (2), as illustrated in FIG. 6A:

$$m(x, y) = \begin{cases} 1 - \sqrt{(x-x_c)^2 + (y-y_c)^2} / R/f(\vec{V}, \vec{D}), & \sqrt{(x-x_c)^2 + (y-y_c)^2} < R/f(\vec{V}, \vec{D}) \\ 0, & \sqrt{(x-x_c)^2 + (y-y_c)^2} \geq R/f(\vec{V}, \vec{D}) \end{cases} \quad (2)$$

where $\vec{D}$ may refer to a direction vector from a point $(x_c, y_c)$ to a point $(x, y)$; $\vec{V}$ may refer to a speed vector; and $f(\vec{V}, \vec{D})$ may refer to a direction factor representing a relationship between $\vec{D}$ and $\vec{V}$. In some embodiments, $f(\vec{V}, \vec{D})$ may be determined according to Equation (3):

$$f(\vec{V}, \vec{D}) = 1 + \lambda \cos(T) \quad (3)$$

where λ may refer to a constant, 0<λ<1; and T may refer to an angle between $\vec{D}$ and $\vec{V}$. As used herein, the membership function may be used to reclassify or transform input data to a 0 to 1 scale based on the possibility of being a member of a specified set. For example, 0 may be assigned to those locations that are definitely not a member of the specified set, and 1 may be assigned to those values that are definitely a member of the specified set, and the entire range of possibilities between 0 and 1 are assigned to some level of possible membership (e.g., the larger the number, the greater the possibility). The membership function associated with the motion area of the obstacle may indicate the moving state (e.g., a position of the obstacle, a moving speed of the obstacle, a moving direction of the obstacle) associated with the obstacle, a moving trend of the obstacle, and a moving range of the obstacle. A position with higher value of the membership function may correspond to a higher risk of collision at the position.

As illustrated in FIG. 6B, 610 and 620 refer to a vehicle and an obstacle, respectively. 640 refers to a moving direction of the obstacle 620. Area 1 refers to a non-navigable area of the obstacle. Area 2 refers to the motion area of the obstacle 620. Lines 650-1, 650-2 . . . and 650-3 refer to contour lines of the membership function associated with the motion area (e.g., area 2) of the obstacle 620. The attenuation of the membership function in the moving direction of the obstacle may be slower than in other directions. The value of the membership function of the position in the moving direction of the obstacle may be larger than that of other positions.

Figure 7:
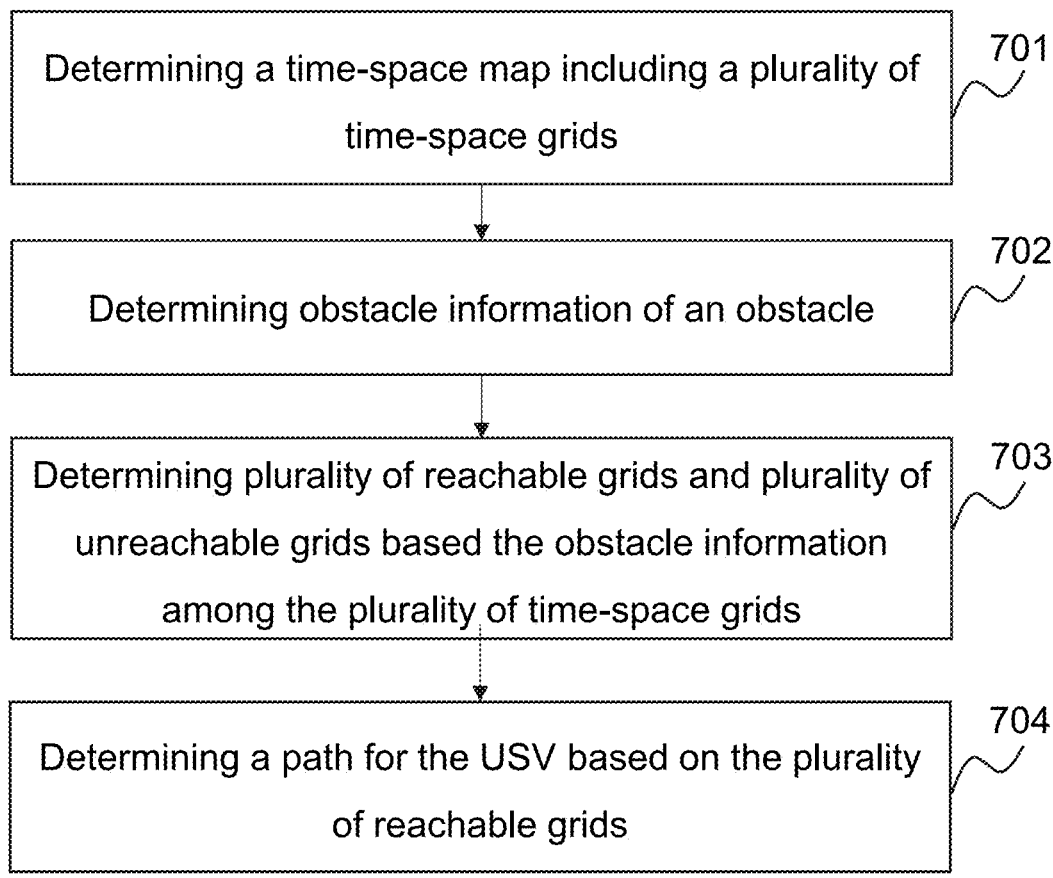
FIG. 7 is a flowchart illustrating an exemplary process for determining a path for a vehicle based on a time-space map according to some embodiments of the present disclosure.

FIG. 7 is a flowchart illustrating an exemplary process for determining a path for a vehicle based on a time-space map according to some embodiments of the present disclosure. The process 700 may be executed by the navigations driving system 100. For example, the process 700 may be implemented as a set of instructions stored in the storage ROM 230 or RAM 240. The processor 220 may execute the set of instructions, and when executing the instructions, the processor 220 may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 illustrated in FIG. 7 and described below is not intended to be limiting.

In 701, the processing engine 112 may determine a time-space map of a first area including a plurality of time-space grids.

The processing engine 112 may determine a search area (e.g., the first area) on a map. In some embodiments, the processing engine 112 may obtain the map from a storage device (e.g., the storage 140), such as the ones disclosed elsewhere in the present disclosure. The search area may include a starting point and a destination point of the vehicle. The processing engine 112 may be configured to search an optimal path for the vehicle to get from the starting point to the destination point in the search area. The search area may be a dynamic search area or a static search area. If obstacles in the search area are unknown or are in motion, the search area may be a dynamic search area. If obstacles in the search area are known or are motionless, the search area may be a static search. In some embodiments, the search area may be a two-dimensional plane or a three-dimensional space. For example, if the vehicle is a car or a ship, the search area may be a two-dimensional area. If the vehicle is an aircraft or a submarine vehicle, the search area may be a three-dimensional space.

To simplify the pathfinding task, the processing engine 112 may divide the search area into a plurality of space grids. The optimal path may be determine based on the plurality of grids. In some embodiments, a shape of a space grid may include but not limited to a square, a rectangle, a hexagon, a triangle, or the like, or any combination thereof. The space grid may include a node. In some embodiments, the node may be a center of the space grid. The space grid may include geographic information corresponding to the grid. In some embodiments, the geographic information may be a coordinate of the center in the search area. The pathfinding task may be considered as moving the vehicle crossing centers of space grids.

The space grid may include a navigable status or an unnavigable status. The navigable status may represent that the vehicle can move into the space grid. The unnavigable status may represent that the vehicle cannot move into the space grid. For example, if a space grid A is occupied by an obstacle, the vehicle cannot move into the space grid A, thus the space grid A is in the unnavigable status.

The processing engine 112 may further determine a time-space map including a plurality of time-space grids corresponding to the search area (e.g., the first area). In some embodiments, the processing engine 112 may determine the time-space map as shown in FIG. 4 or FIG. 5A. Detailed description related to the time-space map and time-space grid may be found elsewhere of the present disclosure, e.g., FIG. 4, FIG. 5A, FIG. 5B and the description thereof.

The processing engine 112 may add temporal information of the space-grid to generate a plurality of time-space grid. As shown in FIG. 5A, the x-y plane may represent the search area, and the z axis may represent to time dimension. The time-space grid may represent status change of the space grid over a period of time. For example, the processing engine 112 may add temporal information T into the space grid A (A1, A2) and determine a time-space grid (A1, A2, T). The time-space grid (A1, A2, T) may be configured to represent the status (the navigable status or the unnavigable status) of the space grid A (A1, A2). For example, the time-space grid (A1, A2, T1) may be configured to represent whether the grid A (A1, A2) is navigable at time point T1.

In some embodiments, the processing engine 112 may add temporal information of the space-grid to generate a plurality of time-space grid when the search area is a three-dimensional space. If the search area is a three-dimensional space, the time-space map and the time-space grid may be four-dimensional (not shown in the figure.) For example, the processing engine 112 may add temporal information T into a three-dimensional space grid A (A1, A2, A3) and determine a time-space grid (A1, A2, A3, T). The time-space grid (A1, A2, A3, T) may be configured to represent the status (the navigable status or the unnavigable status) of the space grid A (A1, A2, A3). For example, the time-space grid (A1, A2, A3, T1) may be configured to represent whether the grid A (A1, A2, A3) is navigable at time point T1.

In 702, the processing engine 112 may determine obstacle information of an obstacle corresponding to a first time period (e.g., from t1 to t2). As described in Operation 701, the status of the time-space grid (e.g., navigable or unnavigable) is related to that whether the time-space grid is occupied at a specific time period or a time point. The status of the time-space grid may be determined based on the obstacle information in following operations (e.g., operation 703).

The obstacle information may include a type of an obstacle (e.g., a vehicle, a pedestrian, an animal, a building, a tree, a roadblock), a location of the obstacle, a size of the obstacle, a velocity of the obstacle, a distance between the current location of the vehicle and the location of the obstacle, or the like, or any combination thereof.

In some embodiments, the obstacle may be a static obstacle. For example, the obstacle may be a building, a tree, a roadblock, a rock on the sea, an island, or the like or any combination. If the static obstacle is known, the processing engine 112 may obtain the static obstacle information from a storage device (e.g., the storage 140), such as the ones disclosed elsewhere in the present disclosure.

In some embodiments, the obstacle may be an obstacle in motion or an unknown obstacle. For example, the obstacle may be a moving vehicle, a pedestrian, an animal, an unknown rock, an unknown island. The processing engine 112 may obtain the obstacle information of the obstacle in motion or the unknown obstacle from the detection units (e.g., a camera, a radar) of the vehicle.

In 703, the processing engine 112 may determine plurality of navigable grids and plurality of unnavigable grids based the obstacle information among the plurality of time-space grids. The processing engine 112 may determine whether a time-space grid is occupied by the obstacle at a time point based on the obstacle information.

For example, if the obstacle is a static obstacle located in (A1, A2), the processing engine 112 may determine the status of a plurality of time-space grids corresponding to the location (A1, A2) (e.g., (A1, A2, T1), (A1, A2, T2), (A1, A2, T3), wherein T1, T2 and T3 represent different time points) as unnavigable.

If the obstacle is in motion, the processing engine 112 may determine a moving trajectory or an obstacle volume of the obstacle in the time-space map based on the obstacle information. Then the processing engine 112 may determine plurality of navigable grids and plurality of unnavigable grids based on the moving trajectory or the obstacle volume of the obstacle in the time-space map.

As shown in FIG. 5A, the navigability of the geographical area may be determined based on the spatial relationship between a time-space grid corresponding to the geographical area in the time period and a movement trajectory corresponding to an obstacle. For example, the processing engine 112 may determine whether the time-space grid corresponding to the geographical area in the time period overlaps with the movement trajectory corresponding to the obstacle. In response to a determination that the time-space grid corresponding to the geographical area in the time period overlaps with the trajectory corresponding to the obstacle, the processing engine 112 may determine that the geographical area represented by the time-space grid is not navigability in the time period. In response to a determination that the time-space grid corresponding to the geographical area in the time period does not overlaps with the movement trajectory corresponding to the obstacle, the processing engine 112 may determine that the geographical area represented by the time-space grid is navigability in the time period.

In FIG. 4, the obstacle is considered as a mass point. Thus, the trajectory shown in FIG. 4 is a line and represents a movement trajectory of the mass center or the geometric center of the obstacle with respect to time. In some embodiments, the obstacle may have a profile. Accordingly, the movement trajectory of the obstacle in a specific time period may be represented as a volume in the X-Y-Z space, as shown in FIG. 5A.

In some embodiments, the processing engine 112 may determine whether the time-space grid corresponding to the geographical area in the time period overlaps with the movement trajectory by performing a collision detection. In some embodiments, the processing engine 112 may perform the collision detection between the time-space grid and the movement trajectory corresponding to an obstacle based on one or more collision detection algorithm. The collision detection algorithm may include an axially aligned bounding box (AABB) algorithm, an oriented bounding box (OBB) algorithm, or the like. For example, the processing engine 112 may completely wrap an object (e.g., an obstacle) with a bounding volume. The bounding volume may be a bounding box (e.g., a cuboid, a cube), a bounding capsule, a bounding cylinder, a bounding sphere, or the like. In the AABB algorithm, the bounding box may be aligned with axes of the coordinate system. The processing engine 112 may further determine whether a collision occurs between the bounding volume including the object and each of the plurality of time-space grids in the X-Y-Z space based on a size and a position of the bounding volume including the object. For example, the processing engine 112 may determine whether a collision occurs between the bounding volume including the object and each of the plurality of time-space grids in the X-Y-Z space by comparing the bounding volume including the obstacle with the each of the plurality of time-space grids. In response to a determination that there is a collision occurs between the bounding volume including the object and one of the plurality of time-space grids in the X-Y-Z space, the processing engine 112 may determine that the bounding volume including the object overlaps with the time-space grid. Accordingly, the processing engine 112 may determine that the time-space grid is not navigability in the time period.

In some embodiments, the processing engine 112 may determine an obstacle trajectory projection of each of the one or more obstacles based on the obstacle volume corresponding to the first time period and determine the plurality of navigable grids and the plurality of unnavigable grids based on the obstacle trajectory projections of the one or more obstacles.

In some embodiments, the processing engine 112 may perform a collision detection between each of the plurality of time-space grids and an obstacle based on a projection of the obstacle on the X-Y plane. As illustrated, it is assumed that the size of an obstacle is a cube, and the start time point and the end time point of the moving of the obstacle are $t_1$ and $t_2$, respectively, the processing engine 112 may determine that coordinates of the center point of the obstacle at the time point $t_1$ and the time point $t_2$ are $(x_{t1}, y_{t1})$ and $(x_{t2}, y_{t2})$, respectively, according to Equation (1). The processing engine 112 may project the positions of the obstacle at time point t1 and time point $t_2$ on the X-Y plane, as illustrated in FIG. 5B. The processing engine 112 may generate a 2D bounding box (e.g., bounding box ABCDE) on the X-Y plane by connecting the vertexes of the obstacle according to the moving direction of the obstacle, which indicates an area through which the obstacle moves from time point t1 to the time point $t_2$, as illustrate in FIG. 5B. FIG. 5B is a schematic diagram illustrating an exemplary bounding box of an obstacle on an X-Y plane according to some embodiments of the present disclosure.

In some embodiments, the processing engine 112 may divide the X-Y plane by a plurality of 2D grids with a length of $\Delta L$ and a width of $\Delta W$, which are the same as the projection of the plurality of time-space grids in the X-Y-Z space on the plane X-Y. Accordingly, the processing engine 112 may determine whether a time-space grid corresponding to a geographical area in a time period is navigability by comparing the 2D bounding box of the moving obstacle in the time period and each of the 2D grids in the X-Y plane. For example, the processing engine 112 may determine whether the 2D bounding box of the moving obstacle in the time period overlaps with each of the plurality of 2D grids in the X-Y plane. In response to a determination that the 2D bounding box of the moving obstacle in the time period overlaps with a 2D grid in the X-Y plane, the processing engine 112 may determine that corresponding time-space grids in the X-Y-Z space is not navigability in the time period. In response to a determination that the 2D bounding box of the moving obstacle in the time period does not overlap with a 2D grid in the X-Y plane, the processing engine 112 may determine that corresponding time-space grids in the X-Y-Z space is navigability in the time period.

As described above, the processing engine 112 may need to compare the bounding box including the obstacle with all of the time-space grids in the X-Y-Z space to determine whether the bounding box overlaps with each of the time-space grids, which may lead to a low computational efficiency. In addition, the bounding box including the obstacle in the AABB algorithm may need to be aligned with the axis and it is sensitive to the direction of the obstacle. In some scenarios, the bounding box including the obstacle may include one or more time-space grids that do not overlap with the obstacle, which may lead to a low accuracy in the collision detection. The method disclosed in the present disclosure covert the 3D structure collision problem into a 2D plane overlapping problem, which may greatly improve the computational efficiency and the accuracy of the collision detection.

In some embodiments, the processing engine 112 may determine a fuzzy set related to each of the one or more obstacles based on the obstacle status and determine the plurality of navigable grids and the plurality of unnavigable grids based on the fuzzy set. For example. the processing engine 112 may determine a membership function based on the obstacle information. Then the processing engine 112 may determine plurality of navigable grids and plurality of unnavigable grids based on the membership function of the obstacle.

In some embodiments, the processing engine 112 may determine a non-navigable area around the obstacle according to a first criteria (e.g., the COLREGs.) As used herein, the non-navigable area may refer to an area that the vehicle cannot enter when performing a path planning. Then the processing engine 112 may determine the fuzzy set (e.g., the membership function) based on the unnavigable area. For example, according to Rule 14a of COLREGs, "when two power-driven vessels are meeting on reciprocal or nearly reciprocal courses so as to involve risk of collision each shall alter her course to starboard so that each shall pass on the port side of the other". Accordingly, the processing engine 112 may determine a non-navigable area on the right side of an obstacle vessel, such as the SUV may be turned to right to avoid the obstacle vessel. As another example, according to Rule 15 of COLREGs, "when two power-driven vessels are crossing so as to involve risk of collision, the vessel which has the other on her own starboard side shall keep out of the way and shall, if the circumstances of the case admit, avoid crossing ahead of the other vessel". Accordingly, the processing engine 112 may determine a non-navigable area in front of the obstacle vessel, such as the vehicle may travel behind the stern of the obstacle vessel to avoid the obstacle vessel.

In some embodiments, the processing engine 112 may determine a membership function associated with the motion area of the obstacle based on the fuzzy set theory according to Equation (2) as illustrated in FIG. 6A and FIG. 6B. As used herein, the membership function may be used to reclassify or transform input data to a 0 to 1 scale based on the possibility of being a member of a specified set. For example, 0 may be assigned to those locations that are definitely not a member of the specified set, and 1 may be assigned to those values that are definitely a member of the specified set, and the entire range of possibilities between 0 and 1 are assigned to some level of possible membership (e.g., the larger the number, the greater the possibility). The membership function associated with the motion area of the obstacle may indicate the moving state (e.g., a position of the obstacle, a moving speed of the obstacle, a moving direction of the obstacle) associated with the obstacle, a moving trend of the obstacle, and a moving range of the obstacle. A position with higher value of the membership function may correspond to a higher risk of collision at the position. If the membership function corresponding to a location (x1, y1) is higher than a threshold (e.g., 0.2), the processing engine 112 may determine that the time-space grids corresponding to location (x1, y1) (e.g., (x1, y1, T1), (x2, y2, T2), wherein T1, T2 represents different time points) is not navigable.

In 704, the processing engine 112 may determine a path for the vehicle based on the plurality of navigable grids. After determining the navigable grids, the processing engine 112 may search the navigable grids and find an optimal path for the vehicle to get from the starting point to the destination point in the search area.

The processing engine 112 may determine the optimal path for the vehicle to get from the starting point to the destination point in the search area. For a pathfinding task, a time-space grids may include a total cost value and a heuristic value. The total cost value of a time-space grid A may be related to a movement cost to move from the starting grid to the time-space grid A, following the path generated to get time-space grid A. The processing engine 112 may determine the cost function based on temporal information and geographic information of the two adjacent navigable grids. The total cost value may be determined based on the cost function. For example, if a path includes a starting grid, a grid A and a grid B. The starting grid is adjacent to the grid A and the grid A is adjacent to the grid B. Thus, the total cost value of grid B is a sum of a cost value for moving from staring grid to the grid A and a cost value for moving from the grid A to the grid B. The heuristic value of the time-space grid A may be related to an estimated movement cost to move from the time-space grid A to the destination grid.

The processing engine may search a plurality of adjacent grids of the starting grid and determine the grid with minimum sum of the cost value and the heuristic value as a parent grid. Then the processing engine 112 may search a plurality of adjacent grids of the parent grid and determine the grid with minimum sum of the cost value and the heuristic value as a new parent grid. The processing engine 112 may iteratively search the new parent grid until the path reaches to the destination grid. The processing engine may search a plurality of adjacent grids of the destination grid and determine the grid with minimum sum of the cost value and the heuristic value as a parent grid. Then the processing engine 112 may search a plurality of adjacent grids of the parent grid and determine the grid with minimum sum of the cost value and the heuristic value as a new parent grid. The processing engine 112 may iteratively search the new parent grid until the path reaches to the current grid.

The processing engine 112 may determine a destination of the vehicle. For at least a portion of the plurality of navigable grids, the processing engine 112 may determine a cost function between two adjacent navigable grids. Then the processing engine 112 may determine a heuristic function between a current grid of the vehicle and the destination of the vehicle. Then the processing engine 112 may determine the path for the vehicle based on the destination of the vehicle, a plurality of cost functions and the heuristic function.

The processing engine 112 may determine the heuristic function based on temporal information and geographic information of the current grid of the vehicle and the destination of the vehicle. The heuristic value may be determined based on the heuristic function. The heuristic function $h(s, s'')$ may indicate an estimated cost of moving from a position s to another position s''. The heuristic function may be nonnegative and forward-backward consistent, that is, according to Equation (4):

$$h(s,s'') \leq h(s,s') + h(s',s'') \qquad (4),$$

where $h(s, s'')$ may refer to a heuristic function; s, s', and s'' may refer to positions of the obstacle. The heuristic function may be admissible no matter what the goal position is, that is, according to Equation (5):

$$h(s,s') \leq c^*(s,s') \qquad (5),$$

where s, s', and s" may refer to positions of the obstacle; h(s, s') may refer to a heuristic function; c*(s, s') may refer to a cost associated with a least-cost path from a position s to a position s'.

The processing engine 112 may determine the cost function based on temporal information and geographic information of the two adjacent navigable grids. The cost value may be determined based on the cost function. In some embodiments, in the X-Y-Z space, a cost associated with a least-cost path from a position to another position may be determined based on a distance cost between the two positions and a time cost between the two positions. The distance cost and/or the time cost between the two positions may be determined based on a Manhattan distance between the two positions. As used herein, a Manhattan distance between two points may refer to a distance between two points measured along axes at right angles. In some embodiment, the cost associated with the least-cost path from a position $p(x_i, y_i, z_i)$ to a position $q(x_{i+1}, y_{i+1}, z_{i+1})$ may be determined according to Equation (6):

$$c(p,q) = |x_{i+1} - x_i| + |y_{i+1} - y_i| + \alpha |z_{i+1} - z_i| \qquad (6),$$

where c(p, q) may refer to a cost associated with a least-cost path from a position p to a position q; $x_i$, $y_i$, $z_i$ may refer to a X-axis coordinate, a Y-axis coordinate, and a Z-axis coordinate of the position p, respectively; $x_{i+1}$, $y_{i+1}$, $z_{i+1}$ may refer to a X-axis coordinate, a Y-axis coordinate, and a Z-axis coordinate of the position q; α may refer to a weight, α>0. The weight a may indicate the importance of the distance cost and/or the time cost in the determination of the cost c(p, q). For example, it is assumed that α=1, it may indicate that the distance cost and the time cost are of the same importance. It is assumed that α>1, it may indicate that the time cost may be more important than the distance cost in the determination of the cost c(p, q). It is assumed that 0<α<1, it may indicate that the distance cost may be more important that the time cost in the determination of the cost c(p, q). The weight a may be default settings of the automatic navigation system 100 or may be adjustable under different situations.

In some embodiments, it is assumed that coordinates of a center position A of a time-space grid and coordinates of a center position B of another time-space grid in the X-Y-Z space are $(x_j, y_j, T_j)$ and $(x_k, y_k, T_k)$, respectively, the heuristic function h(j, k) may be determined according to Equation (7):

$$h(j,k) = \sqrt{\left(\frac{x_j - x_k}{\Delta x}\right)^2 + \left(\frac{y_j - y_k}{\Delta y}\right)^2 + k\left(\alpha \frac{T_j - T_k}{\Delta T}\right)^2}, \qquad (7)$$

where h(j, k) may refer to a heuristic function; $x_j$, $y_j$, $T_j$ may refer to a X-axis coordinate, a Y-axis coordinate, and a Z-axis coordinate of the position A, respectively; $x_k, y_k, T_k$ may refer to a X-axis coordinate, a Y-axis coordinate, and a Z-axis coordinate of the position B; Δx may refer to a length of a time-space grid in the X-Y-Z space; Δy may refer to a width of a time-space grid in the X-Y-Z space; ΔT may refer to a height of a time-space grid in the X-Y-Z space, k may refer to a factor associated with time, 0<k<1. The factor k may affect the heuristic function in the time dimension. For example, if there are a plurality of paths between the start position and the goal position of the vehicle, the processing engine 112 may determine an optimal path that takes a relatively short time from the plurality of paths based on a relatively small factor, that is, the vehicle may reach the goal position as soon as possible. The factor k may be default settings of the automatic navigation system 100 or may be adjustable under different situations.

In some embodiments, first the processing engine 112 may add a starting grid A to an open list. Next the processing engine 112 may search all the navigable grids adjacent to the starting grid A, and add them to the open list. For each of all the navigable grids adjacent to the starting grid A, the processing engine 112 may save the starting grid A as its parent grid. Then the processing engine 112 may drop the starting grid A from the open list and add it to a closed list. Next, the processing engine may iteratively proceed following operations:

(1) In the open list, the processing engine 112 may search a grid B with the minimum sum of the cost value and the heuristic value in the open list, then determine the grid B as a current grid.

(2) Then the processing engine 112 may drop the grid B from the open list and add it to a closed list.

(3) Next the processing engine 112 may search all the navigable grids adjacent to the current gird (i.e., grid B). For each of the navigable grids adjacent to the current gird (i.e., grid B), if it is not in the open list, the processing engine 112 may add it to the open list, and make the current grid (i.e., grid B) the parent grid of this grid.

The processing engine 112 may abort the iterative process when the destination grid is added to the closed list. The processing engine 112 may working backwards from the destination grid, and go from each grid to its parent grid and save all the parents grid as the optimal path.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 700. In the storing operation, the processing engine 112 may store information and/or data associated with the sample vehicle in a storage device (e.g., the storage 140) disclosed elsewhere in the present disclosure. As another example, operation 702 and operation 703 may be performed simultaneously.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A method implemented on a computing device for open-surface navigation for a vehicle in a search area of a map, the computing device including a memory and a plurality of processing circuits, the method comprising:
   dividing the search area into a plurality of space grids;
   determining a time-space map corresponding to the search area by adding temporal information of the plurality of space grids, wherein each space grid corresponds to a plurality of time-space grids which correspond to a plurality of time intervals respectively, the plurality of time intervals being within a time period;

obtaining obstacle status of each of one or more obstacles in the search area corresponding to the time period;

determining a plurality of navigable grids and a plurality of unnavigable grids among the plurality of time-space grids based on the obstacle status, the navigable grid representing a time-space grid not occupied by any obstacle in a time interval corresponding to the time-space grid, the unnavigable grid representing a time-space grid occupied by an obstacle in a time interval corresponding to the time-space grid; and determining a path for the vehicle based on the plurality of navigable grids.

2. The method of claim 1, wherein determining the plurality of navigable grids and the plurality of unnavigable grids further comprises:

determining an obstacle volume for each of the one or more obstacles based on the obstacle status; and determining the plurality of navigable grids and the plurality of unnavigable grids based on the obstacle volumes of the one or more obstacles.

3. The method of claim 2, wherein the method further comprises:

determining an obstacle trajectory projection of each of the one or more obstacles based on the obstacle volume corresponding to the time period; and determining the plurality of navigable grids and the plurality of unnavigable grids based on the obstacle trajectory projections of the one or more obstacles.

4. The method of claim 2, wherein the obstacle volume is determined based on a profile of the obstacle.

5. The method of claim 1, wherein determining the plurality of navigable grids and the plurality of unnavigable grids further comprises:

determining a fuzzy set related to each of the one or more obstacles based on the obstacle status; and determining the plurality of navigable grids and the plurality of unnavigable grids based on the fuzzy set.

6. The method of claim 5, wherein determining the fuzzy set further comprises:

determining an unnavigable area related to the obstacle based on a first criteria;

determining the fuzzy set based on the unnavigable area.

7. The method of claim 1, wherein the method further comprises:

determining a destination of the vehicle;

for at least a portion of the plurality of navigable grids, determining a cost function between two adjacent navigable grids;

determining a heuristic function between a current grid of the vehicle and the destination of the vehicle; and determining the path for the vehicle based on the destination of the vehicle, a plurality of cost functions among the at least the portion of the plurality of navigable girds, and the heuristic function.

8. The method of claim 7, wherein the cost function is determined based on temporal information and geographic information of the two adjacent navigable grids.

9. The method of claim 7, wherein the heuristic function is determined based on temporal information and geographic information of the current grid of the vehicle and the destination of the vehicle.

10. A system for open-surface navigation for a vehicle in a search area of a map, comprising:

at least one non-transitory storage medium including a set of instructions; and processing circuits in communication with the at least one non-transitory storage medium, wherein when executing the set of instructions, the processing circuits are directed to:

divide the search area into a plurality of space grids;

determine a time-space map corresponding to the search area by adding temporal information of the plurality of space grids, the time space map including a plurality of time space grids, wherein each space grid corresponds to a plurality of time-space grids which correspond to a plurality of time intervals respectively, the plurality of time intervals being within a time period;

obtain obstacle status of each of one or more obstacles in the search area corresponding to the time period;

determine a plurality of navigable grids and a plurality of unnavigable grids among the plurality of time-space grids based on the obstacle status, the navigable grid representing a time-space grid not occupied by any obstacle in a time interval corresponding to the time-space grid, the unnavigable grid representing a time-space grid occupied by an obstacle in a time interval corresponding to the time-space grid; and determine a path for the vehicle based on the plurality of navigable grids.

11. The system of claim 10, wherein determining the plurality of navigable grids and the plurality of unnavigable grids further comprises:

determining an obstacle volume for each of the one or more obstacles based on the obstacle status; and determining the plurality of navigable grids and the plurality of unnavigable grids based on the obstacle volumes of the one or more obstacles.

12. The system of claim 11, wherein the system is further configured to:

determine an obstacle trajectory projection of each of the one or more obstacles based on the obstacle volume corresponding to the first time period; and determine the plurality of navigable grids and the plurality of unnavigable grids based on the obstacle trajectory projections of the one or more obstacles.

13. The system of claim 11, wherein the obstacle volume is determined based on a profile of the obstacle.

14. The system of claim 10, wherein determining the plurality of navigable grids and the plurality of unnavigable grids further comprises:

determining a fuzzy set related to each of the one or more obstacles based on the obstacle status; and determining the plurality of navigable grids and the plurality of unnavigable grids based on the fuzzy set.

15. The system of claim 14, wherein determining the fuzzy set further comprises:

determining an unnavigable area related to the obstacle based on a first criteria;

determining the fuzzy set based on the unnavigable area.

16. The system of claim 10, wherein the system is further configured to:

determine a destination of the vehicle;

for at least a portion of the plurality of navigable grids, determine a cost function between two adjacent navigable grids;

determine a heuristic function between a current grid of the vehicle and the destination of the vehicle; and determine the path for the vehicle based on the destination of the vehicle, a plurality of cost functions among the at least the portion of the plurality of navigable grids, and the heuristic function.

17. The system of claim 16, wherein the cost function is determined based on temporal information and geographic information of the two adjacent navigable grids.

18. The system of claim 16, wherein the heuristic function is determined based on temporal information and geographic information of the current grid of the vehicle and the destination of the vehicle.

19. A non-transitory computer readable medium comprising executable instructions that, wherein when executed by processing circuits, the executable instructions cause the processing circuits to effectuate a method for open-surface navigation for a vehicle in a search area of a map, the method comprising:

dividing the search area into a plurality of space grids;

determining a time-space map corresponding to the search area by adding temporal information of the plurality of space grids, wherein each space grid corresponds to a plurality of time-space grids which correspond to a plurality of time intervals respectively, the plurality of time intervals being within a time period;

obtaining obstacle status of each of one or more obstacles in the search area corresponding to the time period;

determining a plurality of navigable grids and a plurality of unnavigable grids among the plurality of time-space grids based on the obstacle status, the navigable grid representing a time-space grid not occupied by any obstacle in a time interval corresponding to the time-space grid, the unnavigable grid representing a time-space grid occupied by an obstacle in a time interval corresponding to the time-space grid; and determining a path for the vehicle based on the plurality of navigable grids.

20. The non-transitory computer readable medium of claim 19, wherein determining the plurality of navigable grids and the plurality of unnavigable grids further comprises:

determining an obstacle volume for each of the one or more obstacles based on the obstacle status; and determining the plurality of navigable grids and the plurality of unnavigable grids based on the obstacle volumes of the one or more obstacles.

* * * * *